(12) United States Patent
 Lester (10) Patent No.: US 12,527,701 B2
(45) Date of Patent: Jan. 20, 2026

(54) STRETCH LAMINATE FOR INCONTINENT DEVICE

(71) Applicant: APLIX, Le Cellier (FR)

(72) Inventor: Donald Harley Lester, Le Cellier (FR)

( * ) Notice: Subject to any disclaimer, the term of this patent is extended or adjusted under 35 U.S.C. 154(b) by 589 days.

(21) Appl. No.: 17/691,300

(22) Filed: Mar. 10, 2022

(65) Prior Publication Data

US 2022/0287889 A1    Sep. 15, 2022

Related U.S. Application Data

(60) Provisional application No. 63/160,079, filed on Mar. 12, 2021.

(51) Int. Cl.
*A61F 13/49*  (2006.01)
*A61F 13/15*  (2006.01)
*A61F 13/62*  (2006.01)

(52) U.S. Cl.
CPC .... *A61F 13/4902* (2013.01); *A61F 13/15203* (2013.01); *A61F 13/625* (2013.01); *A61F 2013/15365* (2013.01); *A61F 2013/49022* (2013.01)

(58) Field of Classification Search
CPC .............. A61F 13/15203; A61F 13/625; A61F 2013/15365; A61F 2013/49022
See application file for complete search history.

(56) References Cited

U.S. PATENT DOCUMENTS

| 8,236,121 | B2 | 8/2012 | Ashraf |
| 8,716,547 | B2 | 5/2014 | Venkitaraman et al. |
| 2001/0027302 | A1* | 10/2001 | Glaug ............... A61F 13/53747 |
| | | | 604/378 |
| 2012/0022490 | A1* | 1/2012 | Marche ................... B32B 3/266 |
| | | | 604/391 |
| 2014/0358107 | A1* | 12/2014 | Bader ............... A61F 13/49015 |
| | | | 604/385.16 |
| 2015/0173982 | A1* | 6/2015 | Bader .................. A61F 13/625 |
| | | | 604/385.01 |

FOREIGN PATENT DOCUMENTS

| EP | 1783257 A1 | 5/2007 |
| WO | 2019145646 A1 | 8/2019 |
| WO | 2019145647 A1 | 8/2019 |
| WO | PCT/2020/052379 A1 | 6/2021 |
| WO | PCT/2020/052380 A1 | 6/2021 |

* cited by examiner

*Primary Examiner* — Susan S Su
*Assistant Examiner* — Erin A Kim (57) ABSTRACT

An element for an incontinent device includes: a stretch laminate having a stretch zone having an elongation with a set of less than about 20%, at a tensile load of 10 N/inch, a dead zone having an elongation of at least about 20% lower than the elongation of the stretch zone, and a hook layer registered in the dead zone of the stretch laminate, and where: H1+H2≥H3, when the hook layer having a height H1, the stretch zone having a height H2, and the dead zone where the hook layer is registered having a height H3.

17 Claims, 10 Drawing Sheets

STRETCH LAMINATE FOR INCONTINENT DEVICE

RELATED APPLICATION

This application claims the benefit of U.S. Provisional patent application Ser. No. 63/160,079 filed Mar. 12, 2021, incorporated herein by reference.

FIELD OF THE INVENTION

This invention is directed to a stretch laminate that may be used as a component of an absorbent article devices (e.g., diapers, pants, incontinent devices).

BACKGROUND OF THE INVENTION

Side panels or ears of absorbent article devices (e.g., diapers, pants, incontinent devices) are typically made with stretch laminate (or elastic composite) fabrics because of their ability to stretch, conform, and allow more freedom of body movement. Stretch laminates (or composites) utilizing one or two nonwoven web layers bonded to an elastic film are known.

For open style diapers, the producers typically purchase the stretch laminates, hook tapes, and adhesive separately and assemble them on their machines to construct the ears. For pants style diapers there are some offerings where the side panels include hook and loop (mechanical fasteners) to allow ease of checking and removal of the pants. The diaper producers also typically purchase the stretch laminates, hook tapes, and adhesive separately and assemble them on their machines to construct the pants. Separate purchase of the stretch materials, hooks, and adhesive require multiple processing stations on the diaper machine include unwinding, cutting, adhesive application and bonding. These processing steps each require machinery, operators, maintenance, and there is associated raw material needs for the assembly, including scrap for each material.

There is interest, on the part of producers, for new stretch laminates with integral fastening hooks (i.e., hooks already bonded to the laminate and ready for processing on the diaper machines), so that the number of converting steps is reduced. This will reduce the scrap generated by splicing of the incoming raw material as the number of incoming raw material is reduced.

The production of these new stretch laminates in roll form, as required by those producers, presents a number of challenges including adequate bonding strength of the hook to the laminate, abrasiveness of the edges of the hooks, uniform roll formation, and cost effectiveness. There is a risk that the adhesive layer between the nonwoven and elastic film can fail when the hook is subjected to a strong peel or shear force allowing the hook to delaminate from the laminate. Lamination of the hook to the stretch laminate can also result in a web which is thicker in the zones where the hook is laminated resulting in a challenge in the winding of rolls which are not uniform in thickness. There is also the unwinding challenge during the customer process and the increase of effort to unwind the roll if the hook engages in the opposite layer.

Accordingly, there is a need for these new stretch laminates (i.e., stretch laminates with integral hook) that address and overcome the limitations of currently available materials.

SUMMARY OF THE INVENTION

An element for an incontinent device includes: a stretch laminate having a stretch zone having an elongation with a set of less than about 20%, at a tensile load of 10 N/inch, a dead zone having an elongation of at least about 20% lower than the elongation of the stretch zone, and a hook layer registered in the dead zone of the stretch laminate, and where: H1+H2≥H3, when the hook layer having a height H1, the stretch zone having a height H2, and the dead zone where the hook layer is registered having a height H3.

DESCRIPTION OF THE DRAWINGS

For the purpose of illustrating the invention, there is shown in the drawings a form that is presently preferred; it being understood, however, that this invention is not limited to the precise arrangements and instrumentalities shown.

FIG. 5A2 is an exploded view of a portion of FIG. 5A.

DESCRIPTION OF THE INVENTION

There are several, nonlimiting, embodiments of the instant invention illustrated in FIGS. 1-9, like elements have like identifiers.

In general, the instant invention is an element, for example, an ear or a side panel 200, of an absorbent article 100 or an incontinent device 100. The incontinent device may be for infants/toddlers/adults and may be used in an open incontinent device, see for example FIGS. 8-9. This element combines a stretch laminate with an integral hook layer. This element is designed to simplify the incontinent device assembly (or manufacture) by reducing the steps in that assembly process, as outlined above.

In general, the element 10 includes: a hook layer 20 affixed to a stretch laminate 30. The hook layer 20 and the stretch laminate 30 have coincident (or parallel) machine directions (MD) and transverse directions (TD). In the drawings (FIGS. 1-6), the TD runs across the face of the sheet, while the MD runs through (or into) the face of the sheet (and perpendicular to the TD). The stretch laminate 30 has a stretch zone 32 running in the MD and a dead zone 34 running in the MD. The stretch zone 32 has (or may have), in cross-section, a first nonwoven 40, a second nonwoven 42, and an elastic film 44 laminated between the first nonwoven 40 and the second nonwoven 42. The dead zone 34 has (or may have), in cross-section, a first nonwoven 40 adhered to a second nonwoven. The hook layer 20 may be registered within the dead zone 34. In other embodiments, see FIGS. 3E and 4A, the dead zone 34 has (or may have), in cross-section, a first nonwoven 40 adhered to a second nonwoven and a portion of the elastic film is therebetween.

In the illustrated embodiments, the layers (40, 42, 44) are adhered together. Any conventional adhesive may be used. The adhesive may be sprayed or extruded, in any conventional manner. For example, the adhesive may be distributed such as a ratio of stripe of the adhesive width to the distance between adjacent stripes of adhesive (as described in the document U.S. Pat. No. 8,716,547 incorporated herein by reference) is between 0.33 and 1, or advantageously of less than 0.33 in order to reduce the amount of adhesive to be used. Stripes of adhesive are shown in the FIGS. 1B and 3C. The adhesive laydown pattern may be: full surface continuous, intermittent, in lines or dots. While adhesives 46 are illustrated, any conventional method of adhesion may be used including: thermal bonding, ultrasonic bonding, bicomponent fibers used for thermobonding the nonwoven, autogenous bonding via molten elastic of the elastic film, and/or encapsulating fibers nonwoven bonding, and combinations thereof.

The nonwovens may be any nonwovens. Such nonwovens include: thermobonded carded, spunlaced, spunbonded, meltblown, spunbonded/meltblown combinations, dry-laid, air laid, wet laid, hydroentangled, needled or any combination thereof. They may use multicomponent fibers or filaments, or a mix of different fibers or filaments, or both. The first nonwoven of the stretch zone and the first nonwoven of the dead zone may be the same or formed from the same single or continuous material. The second nonwoven of the stretch zone and the second nonwoven of the dead zone may be the same or formed from the same single or continuous material. In one embodiment, the first nonwoven is a carded spunlaced nonwoven. In another embodiment, the second nonwoven is a carded thermobonded nonwoven. As illustrated on FIGS. 3C and 3D, the first and second nonwoven may have varying heights, or include additional layers of nonwovens. Examples of nonwoven that may be used for the stretch laminate:

the dead zone. "In register" means the hooks are only in the dead zone and do not extend onto or overlap the stretch zone. In some embodiments, the hook layer may have a selvage 22, See FIGS. 3E, 4A, 7. In these embodiments, the hooks are in register with the dead zone. In other embodiments, the hook layer is registered with the dead zone includes: hooks of the hook layer not extending into the stretch zone. The hook layer may be offset or spaced away from the lateral edge of the stretch zone, e.g., FIGS. 3B, 5B, so long as the hook layer is in register with the dead zone. The hook layer may include two or more strips, see FIGS. 2-5. The hook layer could be as described in the patent application WO2019145647 A1, and/or WO2019145646 A1 and/or PCT/FR2020/052380 and/or PCT/FR2020/052379, all incorporated herein by reference.

The hook layer and stretch laminate are affixed (or joined) together by one or more of the following: adhesive, thermal bonding, ultrasonic bonding, fusion bonding, mechanical bonding with encapsulating fibers, and/or calendering, and combinations thereof.

The stretch zone may be activated and the stretch zone height H2 may be measured after activation. Activation may be by ring roller. The height of the activated stretch zone may be higher than the stretch zone height before activation.

In use, the hook layer is used to removably attach the free end of the ear or side panel to the chassis of the incontinent device by engagement with a loop material affixed to that chassis. Therefore, the tops of the hooks on the hook layer should be at or around the height of the stretch zone material, so that the stretch zone material does not inhibit attachment (or create rolls with varying thickness). In some embodiments, this may be expressed as: the hook layer having a height $H_1$, the stretch zone having a height $H_2$, the stretch laminate where the hook layer is registered with the dead zone having a height $H_3$, and where: $H_1+H_2 \geq H_3$; but by no more than 10%. In other embodiments, this may be expressed as: the hook layer having a height $H_1$, the stretch zone, having a height $H_2$, the stretch laminate where the hook layer is registered with the dead zone having a height $H_3$, and where: $H_2 \geq H_3$.

In some case $H_2$ is comprised between 0.3 mm and 2.0 mm, preferably between 0.4 mm and 1.5 mm, more preferably between 0.5 mm and 1.0 mm.

In some case $H_1$ is comprise between 0.20 mm and 0.5 mm, preferably between 0.25 mm and 0.45 mm, more preferably between 0.30 mm and 0.45 mm.

|  | Nonwoven 1 (e.g. Hook side) | Nonwoven 2 (e.g. Opposite Hook side) |
| --- | --- | --- |
| Ex. 1 | Carded Thermobonded 100% PP 27 gsm. From: Sandler Sawabond ® 7561 | Carded Thermobonded 100% PP 22 gsm From: Sandler Sawabond ® 7561 |
| Ex. 2 | Spunlace 100% PP 30 gsm From: Sandler Sawasoft ® 2626 | Spunbond 100% PP CD Rod HES 20 gsm From: Fitesa CD Rod HES |
| Ex. 3 | Spunlace 100% PP 30 gsm From: Sandler Sawasoft ® 2626 | Spunlace 100% PP 30 gsm From: Sandler Sawasoft ® 2626 |
| Ex. 4 | Spunlace 100% PP 30 gsm From: Sandler Sawasoft ® 2626 | Carded Thermobonded 100% PP 22 gsm From: Sandler Sawabond ® 7561 |

Other combinations of nonwovens may be used, and the present description is not limited to the nonwovens cited in these examples.

The hook layer 20 may include a plurality of hooks protruding up from a base 25. As is well known, these types of strips are typically extruded. The hooks may extend across the base 25 from lateral edge to lateral edge of the strip, i.e., without selvage. These hooks are in register with In some case $H_3$ is comprise between 0.25 mm and 2.5 mm, preferably between 0.35 mm and 1.5 mm, more preferably between 0.45 mm and 1.0 mm.

The value of $H_1$ and/or $H_2$ and/or $H_3$ could be measured by using a PRECISION THICKNESS TESTER under reference "D-2005-V", using a pressure of 0.1 kPa and a circular caliper with a diameter of 23 mm, i.e.; roughly 415 $mm^2$.

If necessary, the value H₂ could be measured by optical measurement, for example by using Macroscope 0.57×-9.2× of type Z16APO available from Leica.

|  | H1 (mm) | H2 (mm) | H3 (mm) | H1 + H2 (mm) |
| --- | --- | --- | --- | --- |
| Ref. 2 | 0.37 | 0.56 | 0.67 | 0.93 |
| Ref. 3 | 0.36 | 0.73 | 0.76 | 1.09 |
| Ref. 4 | 0.37 | 0.72 | 0.68 | 1.09 |

The hook layer arranged on the element of the absorbent article device has a length in machine direction (MD) that is less than 300 mm, in other case less than 250 mm, in another case less than 200 mm.

The hook layer comprises a plurality of hooks having a height between 0.12 mm and 0.33 mm, in particular between 0.18 mm and 0.32 mm.

On the figures, 1A to 6, the hook layer is represented as direct lamination on the nonwoven, i.e., without adhesive. In some other case, the hook layer could be affixed to the elastic laminate by other technique such as ultrasonic bonding or thermobonding.

Figure 3A:
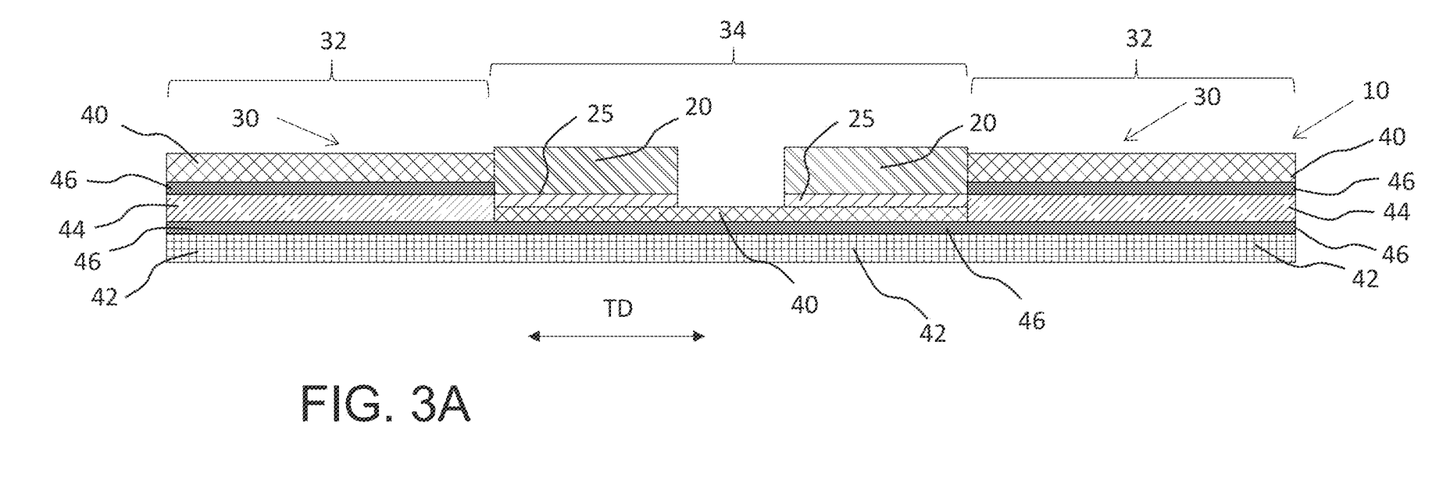
FIG. 3A is an illustration of another embodiment of the invention.
Figure 3B:
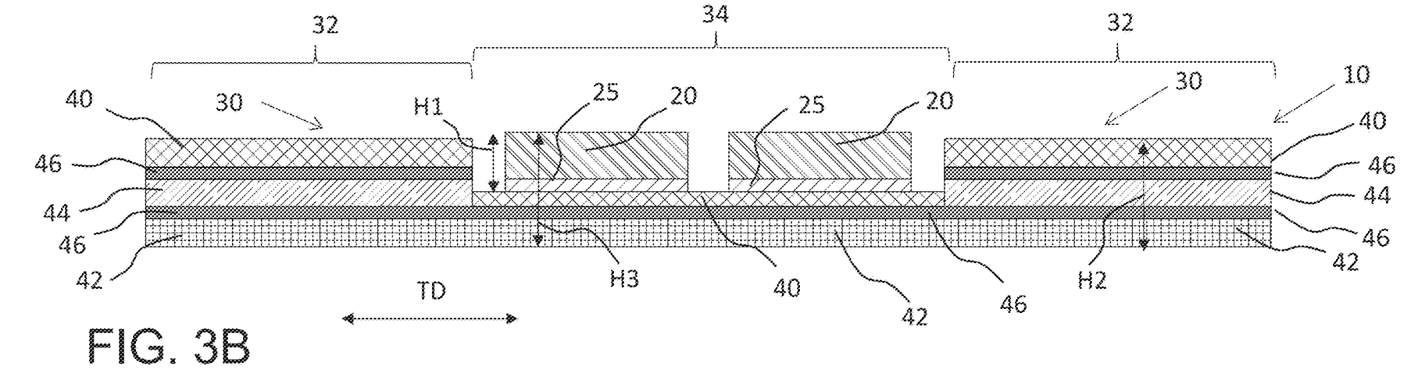
FIG. 3B is an illustration of another embodiment of the invention.
Figure 3C:
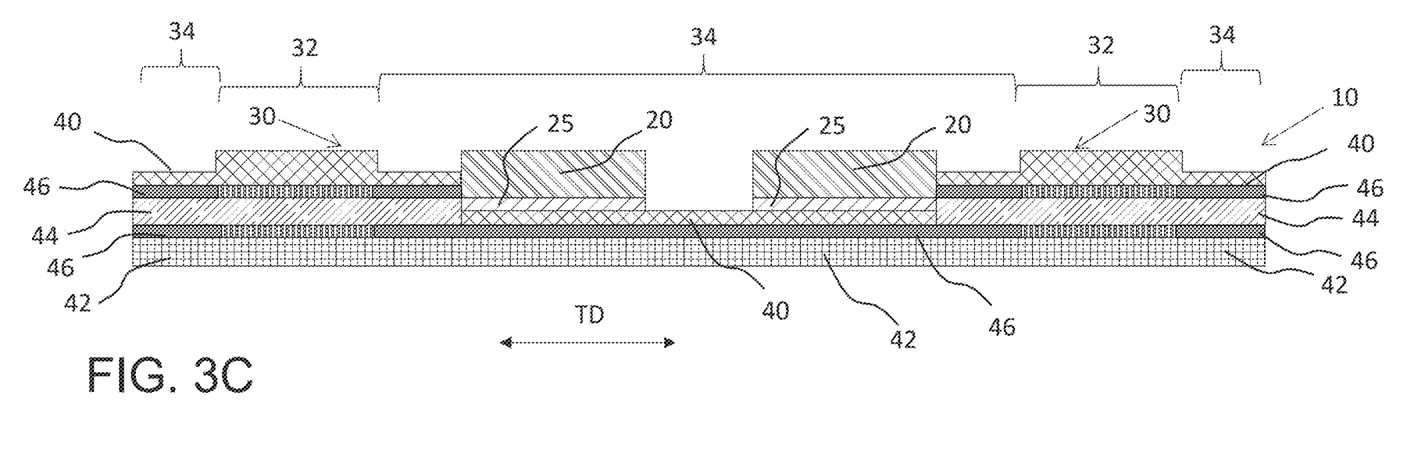
FIG. 3C is an illustration of another embodiment of the invention.
Figure 3D:
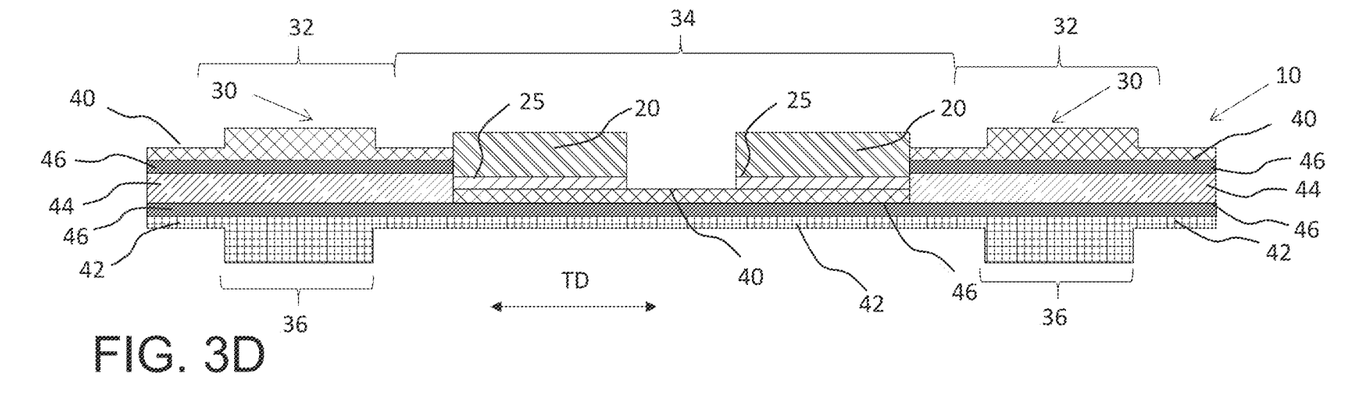
FIG. 3D is an illustration of another embodiment of the invention.
Figure 3E:
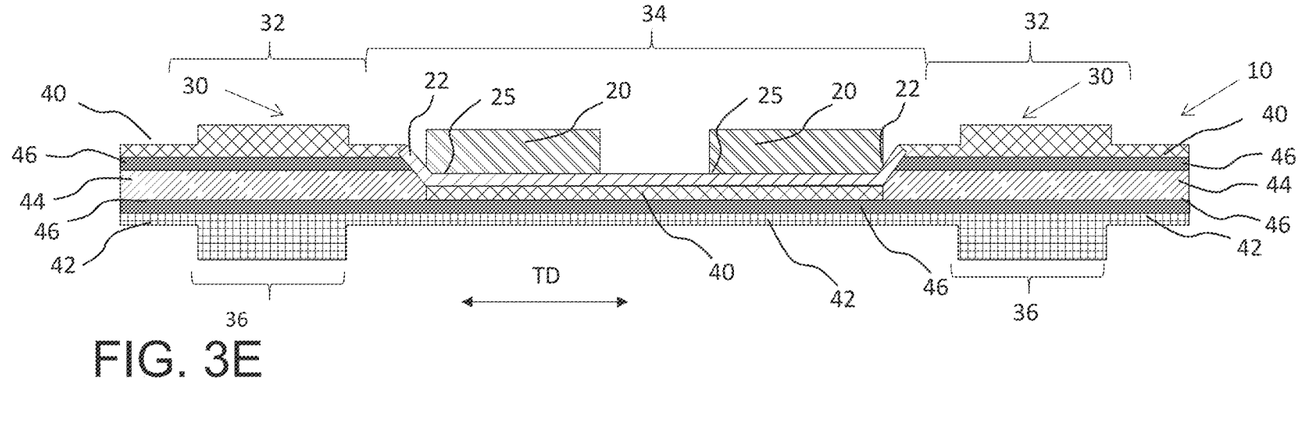
FIG. 3E is an illustration of another embodiment of the invention.
Figure 4A:
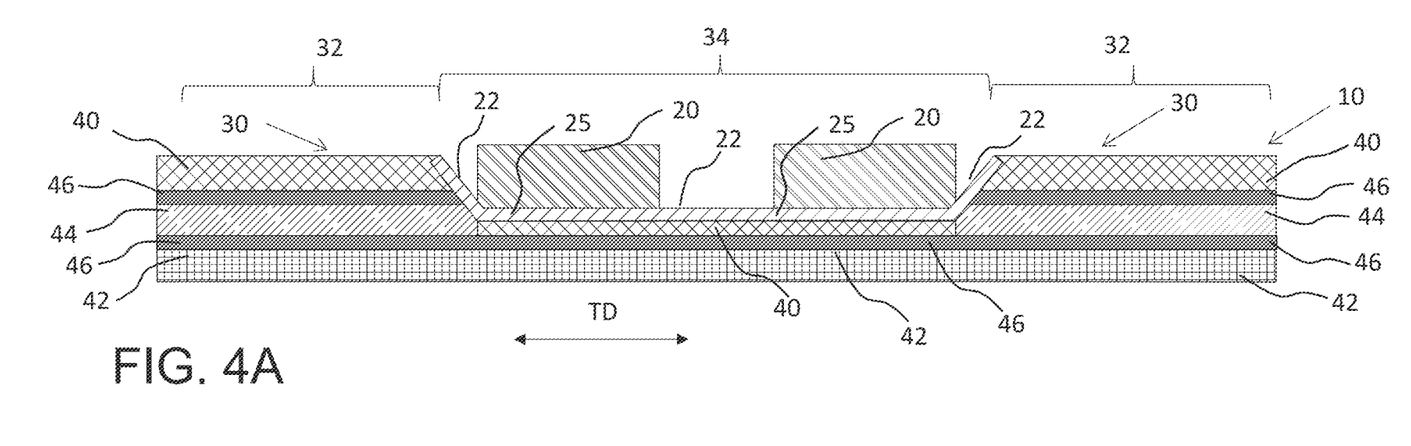
FIG. 4A is an illustration of another embodiment of the invention.
Figure 5A:
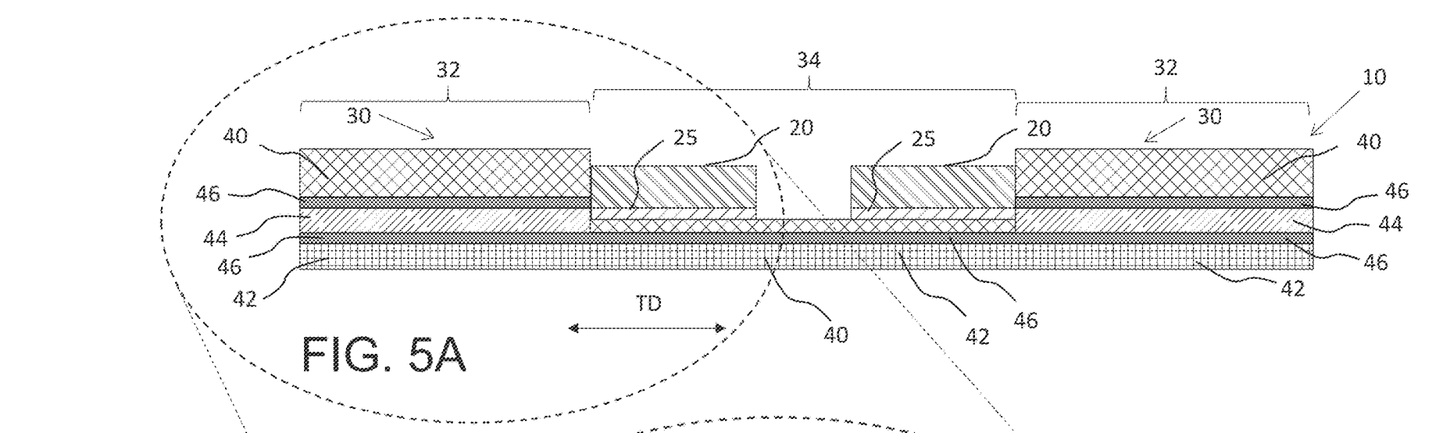
FIG. 5A is an illustration of another embodiment of the invention.
Figure 5A:
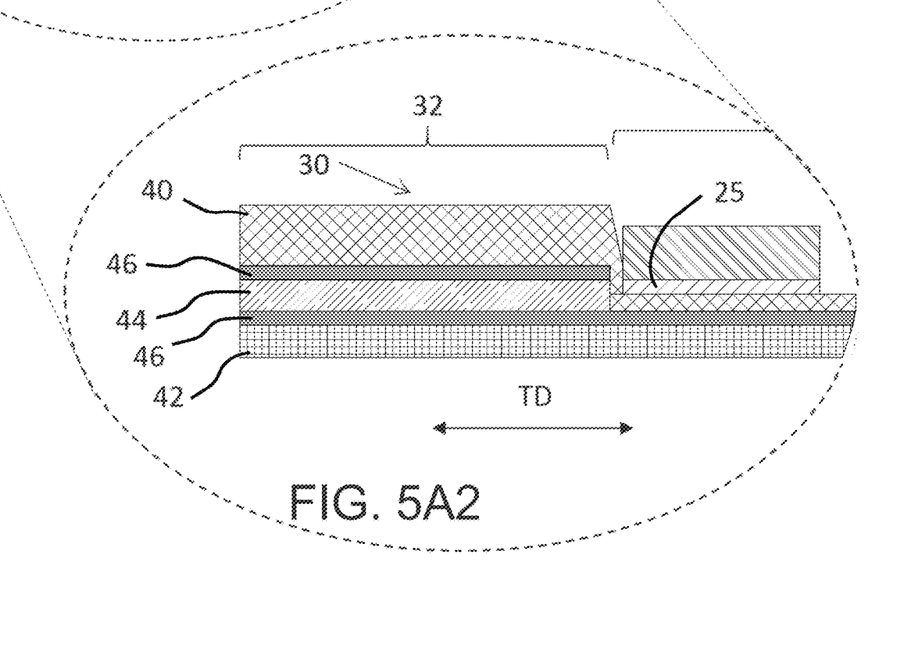
Figure 5B:
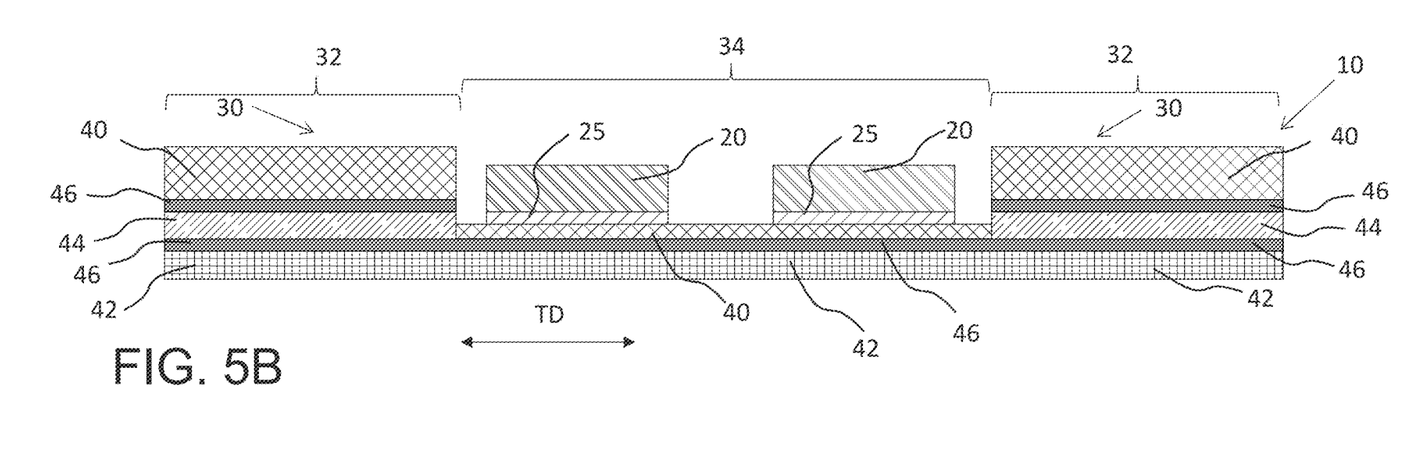
FIG. 5B is an illustration of another embodiment of the invention.
Figure 6:
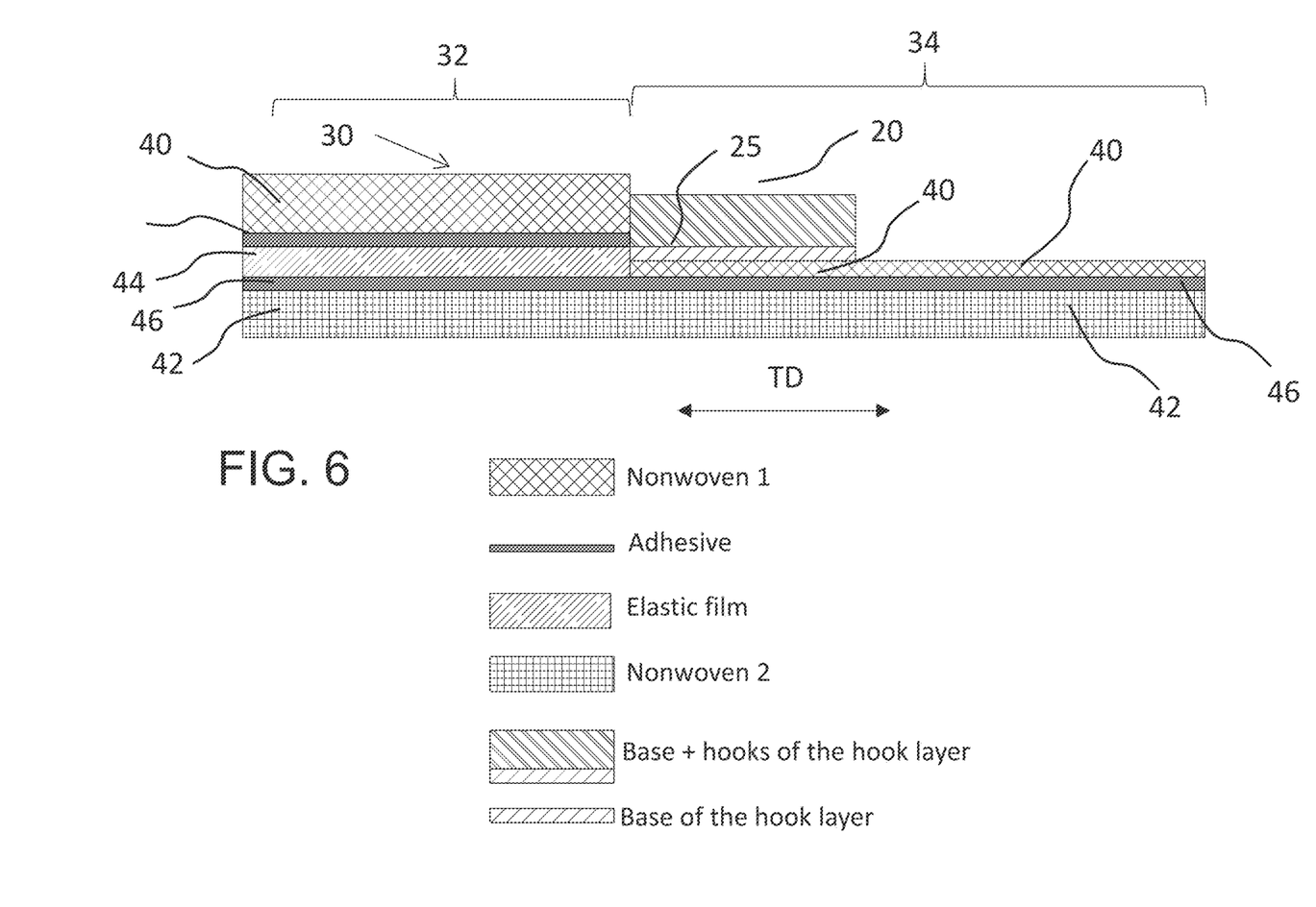
FIG. 6 is an illustration of another embodiment of the invention.
Figure 7:
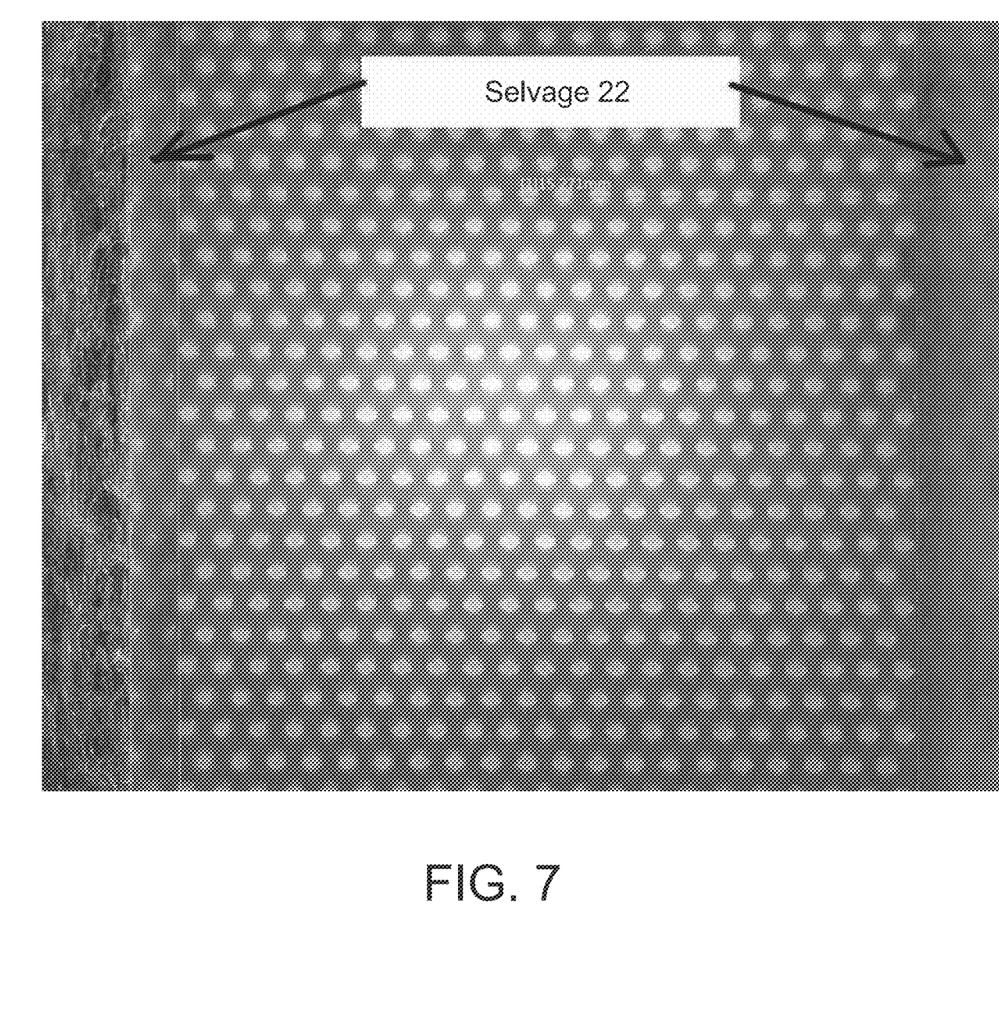
FIG. 7 is a photograph of an exemplary hook layer with selvage.
Figure 8:
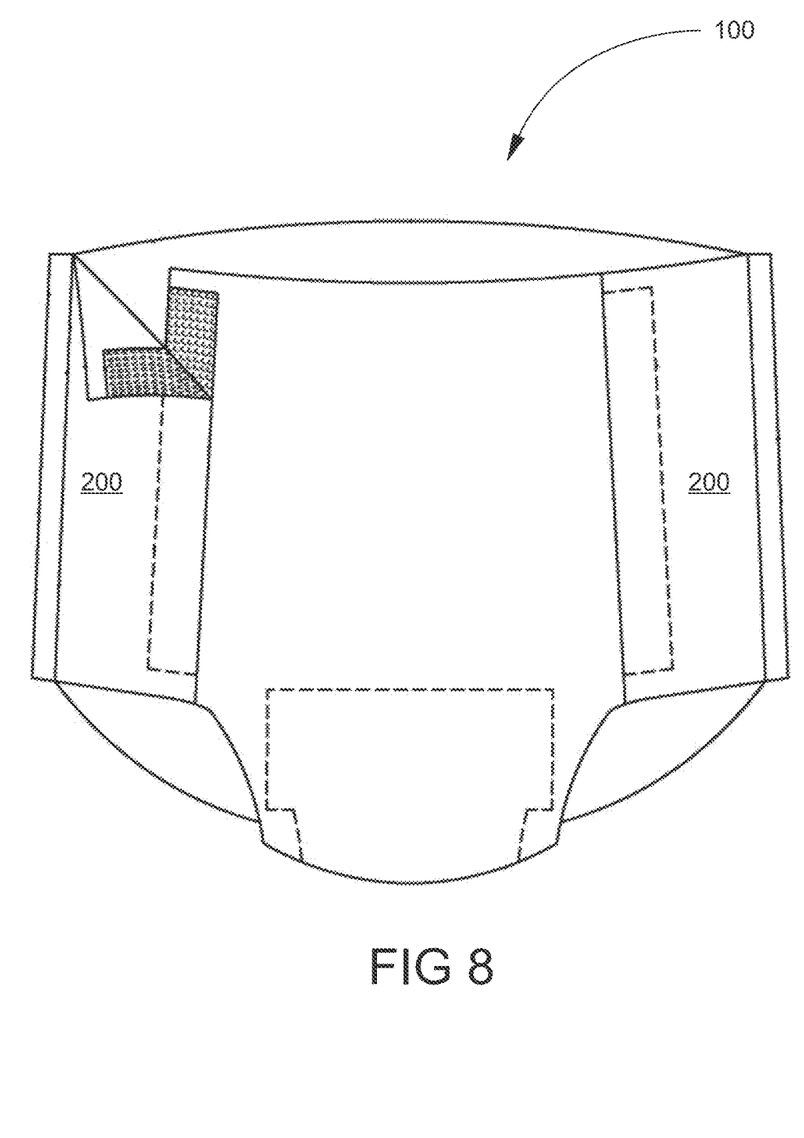
FIG. 8 is an illustration of an open style diaper in a closed configuration.
Figure 9:
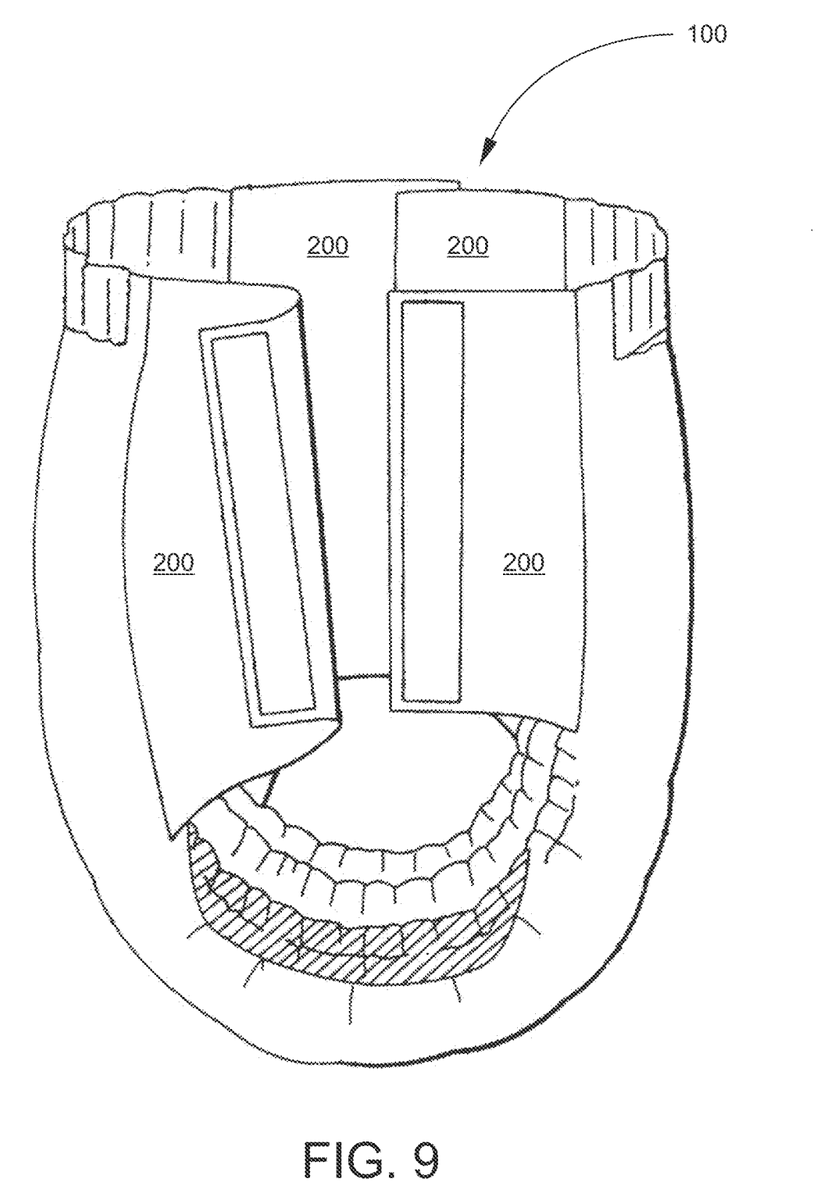
FIG. 9 is an illustration of an open style diaper in an open configuration.

On the FIG. 3D, the area 36 represented an activated area 36 and the area 32 represented the stretch zone 32 that is different than the activated area 36. In another embodiment, the activated area or the stretch zone could be the same or different.

The hook layer arranged on the absorbent article device has a length in machine direction (MD) that is more than 30 mm, in some case more than 40 mm, in one other case more than 50 mm, in another case more than 60 mm.

Figure 1A:
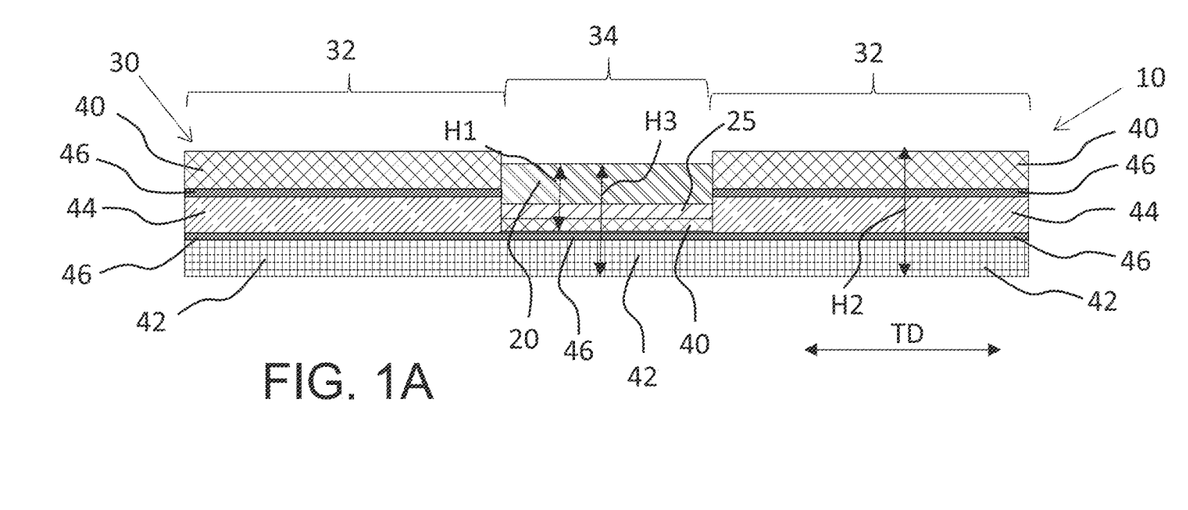
FIG. 1A is an illustration of an embodiment of the invention.
Figure 1B:
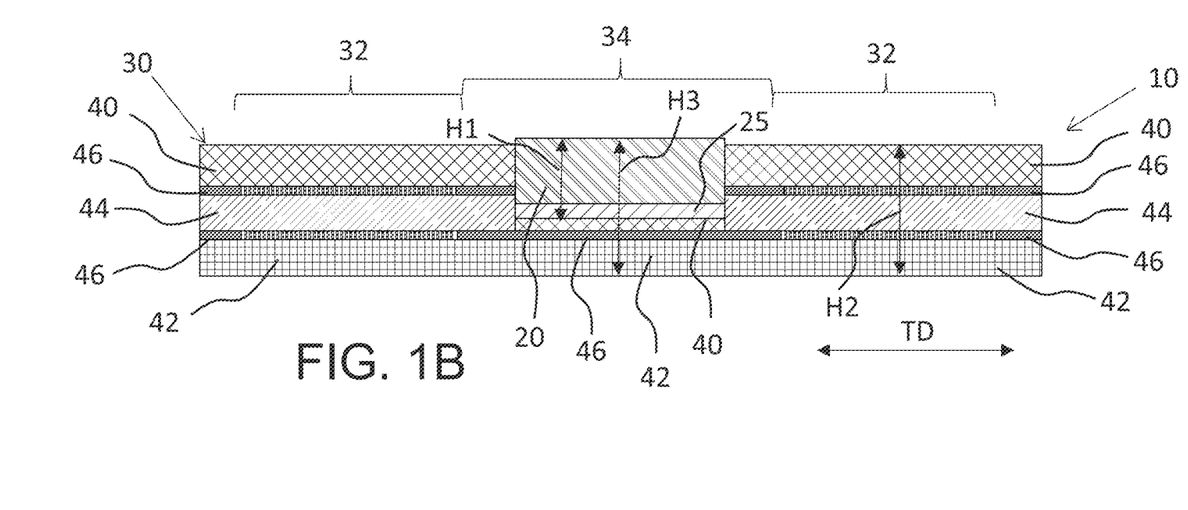
FIG. 1B is an illustration of another embodiment of the invention.
Figure 2:
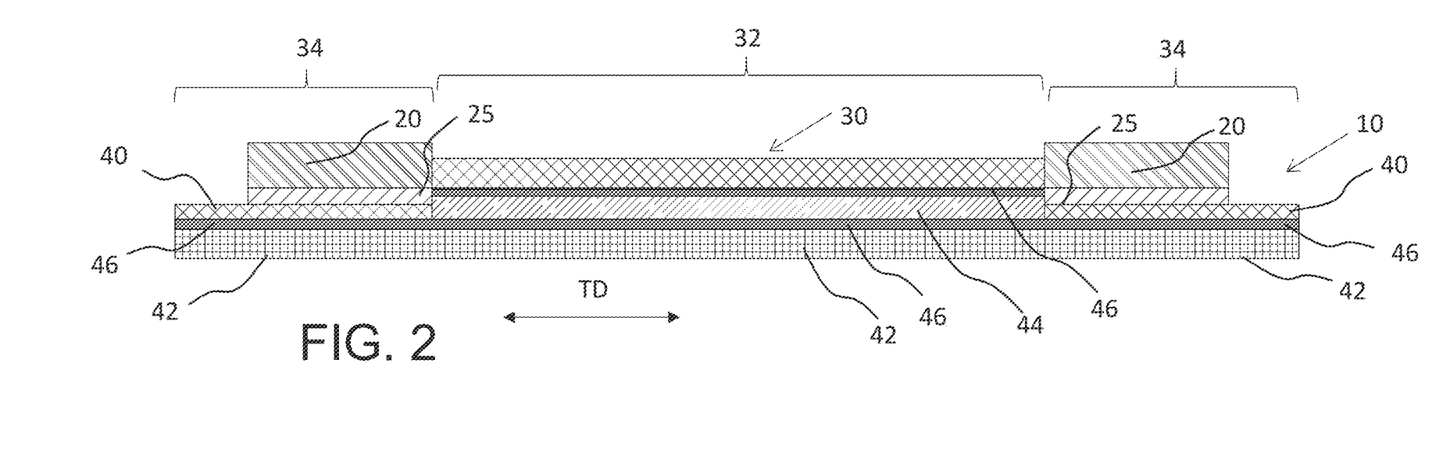
FIG. 2 is an illustration of another embodiment of the invention.

At FIGS. 1B and 3C, the adhesive is applied in lines in the middle of the elastic film and in full in the area bordering the ends of the elastic films. The adhesive of the embodiments of FIGS. 1A, 2, 3A, 3B, 3D, 3E, 4A, 5A, 5B and 6 is on the whole surface but could be similar as represented to FIGS. 1B and 3C.

The stretch zone having an elongation with a SET of less than 20% (preferably 5% to 15%) at tensile load of 10 N/inch. The test method used to measure such SET could be the same as described.

The term "stretch zone having an elongation with a SET of less than 20%" is used to mean a material suitable for being stretched under the effect of a stretching force exerted in the lateral direction and then for returning substantially to its initial shape and dimensions after said stretching force has been released. By way of example, it may be a material that conserves residual deformation or remanence after elongation and release (where such residual deformation is also referred to as "permanent set" or "set") that is less than 20% of its initial dimension (prior to elongation) after being lengthened by 100% of its initial dimension, and at ambient temperature (23.degree. C.). Set can be measured as described in patent application EP 1 783 257, the content of which is incorporated by reference, and in particular the paragraphs to of the publication EP 1 783 257 A1 which describe in detail an example of measuring set.

In some embodiment, the stretch zone having an elongation with a SET of at between 5% and 15%.

The term "at tensile load of 10 N/inch" is a test similar to the one described above about the SET in which the value at the first elongation at 10N is recorded during the first elongation of the tested sample.

In some embodiment, the elongation of the dead zone is at least 20% lower at tensile load of 10 N/inch that the elongation of the stretch zone at tensile load of 10 N/inch. In some other embodiment, the elongation of the dead zone is at least 50% lower at tensile load of 10 N/inch that the elongation of the stretch zone at tensile load of 10 N/inch.

In some embodiment, the elastic film and/or the first nonwoven are laminated when the elastic film is under tension (or at stretched state) as described in the document U.S. Pat. No. 8,236,121 herein incorporated by reference in order to obtain the stretch zone. The hook layer is between 15 gsm and 120 gsm, in particular between 15 gsm and 70 gsm. The height of the base is between 0.04 mm and 0.1 mm, in particular between 0.2 and 0.8.

Alternatively, the invention may be described as:

An element for an absorbent article device, for example for an incontinent device, comprises: the stretch laminate comprising a first nonwoven, a second nonwoven, and an elastic film laminated between the first nonwoven and the second nonwoven, a hook layer affixed to a stretch laminate, in particular to the first nonwoven or the second nonwoven, the hook layer and the stretch laminate having respective parallel machine directions (MD) and transverse directions (TD), a stretch zone having an elongation with a SET of less than 20% (preferably 5% to 15%) at tensile load of 10 N/inch, a dead zone, the elongation of the dead zone is at least 20% lower at tensile load of 10 N/inch that the elongation of the stretch zone at tensile load of 10 N/inch, preferably the elongation of the dead zone is at least 50% lower at tensile load of 10 N/inch that the elongation of the stretch zone at tensile load of 10 N/inch, wherein the hook layer is registered in the dead zone, and wherein the hook layer having a height H1, the stretch zone having a height H2, the dead zone where the hook layer is registered having a height H3, and where: H1+H2≥H3.

The element according to the previous paragraph, wherein the stretch zone having in cross-section, a width, at least a portion of the first nonwoven, at least a portion of the second nonwoven and at least a portion of the elastic film; the first nonwoven adhered to a second nonwoven and the elastic film extending in the full width of the stretch zone.

The element of one of the previous paragraphs, wherein the dead zone having, in cross-section, at least a portion of the first nonwoven and at least a portion of the second nonwoven; the first nonwoven adhered to a second nonwoven.

The element of one of the previous paragraphs, wherein the dead zone having, in cross-section, at least a portion of the first nonwoven, at least a portion of the second nonwoven and at least a portion of the elastic film; the first nonwoven adhered to a second nonwoven and a portion of the elastic film is there between.

The element of the previous paragraph, wherein the portion of the elastic film in the dead zone is less than 50% (preferably less than 40%) of the total width of the elastic film.

The element of one of the previous paragraphs, wherein the portion of the elastic film in the dead zone is less than 30 mm (preferably less than 25 mm) of the total width of the elastic film.

The element of one of the previous paragraphs, wherein the dead zone having, in cross-section, a first nonwoven adhered to a second nonwoven and excluding any elastic film there between.

The element of one of the previous paragraphs, wherein the hook layer being registered within the dead zone, the hook layer is affixed to the first nonwoven or to the second nonwoven.

The element of one of the previous paragraphs, wherein the first nonwoven comprising an inner surface facing the elastic film and an outer surface opposite to the inner surface, the second nonwoven comprising an inner surface facing the elastic film and an outer surface opposite to the inner surface, a hook layer is affixed to the outer surface of the first nonwoven or to the outer surface of the first nonwoven second nonwoven, in particular by direct lamination or by an adhesive or by ultrasonic bonding.

The element of one of the previous paragraphs, wherein $H_2 \geq H_3$, in particular $H_2 \geq 1.2*$(times) $H_3$.

The element of one of the previous paragraphs, wherein $H_3$ is between 0.80% and 1.20% of $H_2$, in particular $H_3$ is between 0.90% and 1.1% of $H_2$.

The element of one of the previous paragraphs, wherein the hook layer and stretch laminate are affixed together by one of more of the following: adhesive, thermal bonding, ultrasonic bonding, fusion bonding, mechanical bonding with encapsulating fibers, calendering and combinations thereof.

The element of one of the previous paragraphs, wherein at least one of the first and/or the second nonwoven is a bi-component nonwoven.

The element of one of the previous paragraphs, wherein the stretch zone is activated and the stretch zone height $H_2$ is measured after activation.

The element of one of the previous paragraphs, where activation is by ring rolling.

The element of one of the previous paragraphs, wherein the elastic film and the first nonwoven are laminated when the elastic film is under tension.

The element of one of the previous paragraphs, wherein the hook layer includes hooks up to one of the lateral edges of the hook layer and no selvage at the corresponding one of the lateral edges, or the hook layer having a selvage at one of the lateral edges and the hooks up to the selvage or the hook layer having two selvages at each of the lateral edges and the hooks up to the corresponding selvage.

The element of the previous paragraph, wherein the elastic film extending in the dead zone, the selvage extending above at least a portion of the elastic film.

The element of one of the previous paragraphs, wherein the first nonwoven of the stretch zone and the first nonwoven of the dead zone are the same or formed from the same single or continuous material.

The element of one of the previous paragraphs, wherein the second nonwoven of the stretch zone and the second nonwoven of the dead zone are the same or formed from the same single or continuous material.

The element of one of the previous paragraphs, wherein the nonwovens may be any nonwoven including: thermobonded carded, spunlaced, spunbonded, meltblown, spunbonded/meltblown combinations, dry-laid, air laid, wet laid, hydroentangled, needled, and combinations thereof.

The element of the previous paragraph, wherein the first nonwoven is a short fibers based nonwoven, in particular a carded nonwoven, more particular a carded spunlaced nonwoven, or a carded thermobonded nonwoven.

The element of one of the previous paragraphs, wherein second nonwoven is a short fibers based nonwoven, in particular a carded nonwoven, more particular a carded spunlaced nonwoven or a carded thermobonded nonwoven.

The element of the previous paragraph, wherein one of the first and second nonwovens are a spunbond nonwoven or a spunmelt nonwoven.

The element of one of the previous paragraphs, wherein the dead zone comprises a full width of adhesive and/or the hook layer.

The element of one of the previous paragraphs, wherein the element comprises at least one stretch zone and at least two dead zones, the dead zone are arranged each sides of the stretch zone.

The element of one of the previous paragraphs, wherein the element comprises two stretch zones and three dead zones, the stretch zone and dead zone are arranged by alternation.

A roll of an elongated material comprising an element according to one of the previous paragraphs.

A roll of an elongated material comprising an element wherein the roll is a planetary roll or a cross wound roll.

Absorbent article device comprising; a topsheet, a backsheet, an absorbent core disposed at least partially intermediate the topsheet and the backsheet, an acquisition material disposed at least partially intermediate the topsheet and the absorbent core, and an element according to one of the previous paragraphs.

Absorbent article device according to the previous paragraph, wherein the absorbent article device comprises two side panels or two ears affixed to at least one extremity of the topsheet and/or the backsheet in order to close the absorbent article.

The absorbent article of any of the foregoing paragraphs being a diaper, pants, and/or any incontinent device.

The absorbent article of any of the previous paragraphs, wherein the portion of the elastic film in the dead zone is less than 40% (preferably less than 30%) of the total width of the elastic film.

The absorbent article of any of the previous paragraphs, wherein the portion of the elastic film in the dead zone is less than 30 mm (preferably less than 25 mm) of the total width of the elastic film.

The present invention may be embodied in other forms without departing from the spirit and the essential attributes thereof, and, accordingly, reference should be made to the appended claims, rather than to the foregoing specification, as indicating the scope of the invention.

I claim:

1. An element for an absorbent article device or an incontinent device comprises:
    a stretch laminate having
        a first nonwoven, a second nonwoven, and an elastic film laminated between the first nonwoven and the second nonwoven,
        a stretch zone having an elongation with a set of 5% to 15%, at a tensile load of 10 N/inch,
        a dead zone having an elongation of at least about 50% lower at tensile load of 10 N/inch that the elongation of the stretch zone at tensile load of 10 N/inch, and
        a hook layer affixed to the first nonwoven or the second nonwoven of the stretch laminate, the hook layer and the stretch laminate having parallel machine directions (MD) and transverse directions (TD), the hook layer is registered in the dead zone, and
    wherein
        the hook layer having a height H1,
        the stretch zone having a height H2,
        the dead zone where the hook layer is registered having a height H3, and where H1+H2≥H3, and
    wherein the dead zone having, in cross-section, at least a portion of the first nonwoven, at least a portion of the second nonwoven and at least a portion of the elastic film; the first nonwoven adhered to a second nonwoven and a portion of the elastic film is therebetween.

2. The element according to the claim 1, wherein the stretch zone having, in cross-section, a width with at least a portion of the first nonwoven, at least a portion of the second nonwoven, and at least a portion of the elastic film; the first nonwoven, the second nonwoven and the elastic film adhered together and extending in the full width of the stretch zone.

3. The element of claim 1, wherein the portion of the elastic film in the dead zone is less than about 30%, of a total width of the elastic film.

4. The element of claim 1, wherein the portion of the elastic film in the dead zone is less than about 25 mm, of a total width of the elastic film.

5. The element of claim 1, wherein the dead zone having, in cross-section, a first nonwoven adhered to a second nonwoven and excluding any elastic film therebetween.

6. The element of claim 1, wherein
the first nonwoven comprising an inner surface facing the elastic film and an outer surface opposite to the inner surface,
the second nonwoven comprising an inner surface facing the elastic film and an outer surface opposite to the inner surface,
a hook layer is affixed to the outer surface of the first nonwoven or to the outer surface of the second nonwoven, in particular by direct lamination or by an adhesive or by ultrasonic bonding.

7. The element of claim 1, wherein $H_2 \geq 1.2*(times) H_3$.

8. The element of claim 1, wherein $H_3$ is between 0.90 and 1.1 of $H_2$.

9. The element of claim 1, wherein the stretch zone is activated and the stretch zone height $H_2$ is measured after activation.

10. The element of claim 1, wherein the hook layer includes hooks up to one of the lateral edges of the hook layer and no selvage, or the hook layer having a selvage at one of the lateral edges and the hooks up to the selvage' or the hook layer having two selvages at one at each of the lateral edges and the hooks up to the corresponding selvage.

11. The element of claim 1, wherein the second nonwoven of the stretch zone and the second nonwoven of the dead zone are the same or formed from the same single or continuous material.

12. The element of claim 1, wherein the first and/or second nonwovens are selected from the group consisting of: thermobonded carded, spunlaced, spunbonded, meltblown, spunbonded/meltblown combinations, dry-laid, air laid, wet laid, hydroentangled, needled and combinations thereof.

13. The element of claim 1, wherein one of the first and second nonwovens are a spunbond nonwoven or a spunmelt nonwoven.

14. The element of claim 1, wherein the element comprises at least one stretch zone and at least two dead zones, the dead zone are arranged each sides of the stretch zone.

15. A roll of an elongated material comprising the element according to claim 1.

16. An absorbent article device comprising:
a topsheet, a backsheet, an absorbent core disposed at least partially intermediate the topsheet and the backsheet, an acquisition material disposed at least partially intermediate the topsheet and the absorbent core, and an element according to claim 1.

17. An absorbent article device according to the claim 1, wherein the absorbent article device comprises two side panels or two ears affixed to at least one extremity of the topsheet and/or the backsheet in order to close the absorbent article.

* * * * *